United States Patent [19]

Kaizerman et al.

[11] 4,198,330

[45] Apr. 15, 1980

[54] POLYURETHANE LATICES MODIFIED BY A VINYL POLYMER

[75] Inventors: Samuel Kaizerman; Romeo R. Aloia, both of Somerville, N.J.

[73] Assignee: American Cyanamid Company, Stamford, Conn.

[21] Appl. No.: 631,358

[22] Filed: Nov. 12, 1975

Related U.S. Application Data

[63] Continuation of Ser. No. 462,489, Apr. 19, 1974, abandoned, which is a continuation-in-part of Ser. No. 349,336, Apr. 9, 1973, abandoned.

[51] Int. Cl.$^2$ .............................................. C08L 75/00
[52] U.S. Cl. ...................... 260/29.6 R; 260/29.6 NR; 525/185
[58] Field of Search ................. 260/29.6 NR, 29.6 R, 260/859 R, 859 P

[56] References Cited

U.S. PATENT DOCUMENTS

| | | | |
|---|---|---|---|
| 3,479,310 | 11/1969 | Dieterich et al. | 260/77.5 AM |
| 3,658,939 | 4/1972 | Carpenter | 260/858 |
| 3,684,758 | 8/1972 | Honig et al. | 260/29.6 NR |
| 3,705,164 | 12/1972 | Honig et al. | 260/29.6 NR |
| 3,759,873 | 9/1973 | Hudak | 260/858 |

OTHER PUBLICATIONS

Bikales, Encyclopedia Reprints, Extrusion etc., Wiley Interscience (1971), p. 128.
Bikales, Encyclopedia Reprints, Characterization of Polymers, Wiley-Interscience (1971), pp. 10–11, 96–98, 208 & 209.

*Primary Examiner*—Maurice J. Welsh
*Attorney, Agent, or Firm*—Frank M. Van Riet

[57] ABSTRACT

A composition of matter is provided comprising a polyurethane latex and a polymer of at least one vinyl monomer, said polymer having been obtained by free radical polymerization of said monomer in the presence of the latex and being characterized as a hard, resinous material at temperatures below about 60° C.

14 Claims, No Drawings

POLYURETHANE LATICES MODIFIED BY A VINYL POLYMER

CROSS REFERENCE TO RELATED APPLICATIONS

This application is a continuation of abandoned application Ser. No. 462,489, filed Apr. 19, 1974, which, in turn, is a continuation-in-part of abandoned application Ser. No. 349,336, filed Apr. 9, 1973.

Generally stated, the subject matter of the present invention relates to a new polyurethane latex composition which provides films and coatings of improved strength. More particularly, the invention relates to a polyurethane latex composition comprising the latex and a polymer of at least one vinyl monomer. In addition, the invention also relates to the products prepared from the polyurethane latex composition especially supported and unsupported films.

BACKGROUND OF THE INVENTION

The preparation of polyurethane polymers by the reaction of organic diisocyanates with polyols having a molecular weight of 500 or more is well-known. The initial product of this reaction, an isocyanate terminated prepolymer, may be chain extended with a variety of chain extending agents, such as water, to produce a high molecular weight polyurethane polymer. Water was one of the first chain extenders employed in preparing polyurethane polymers. The process usually involved milling on a standard rubber mill and resulting in a dry, crumbly mass.

Water is also used as a chain extending agent employing other means. In particular, an emulsion of the isocyanate terminated prepolymer is formed and the chain extension reaction is allowed to proceed in this state. The resulting emulsified, fully chain extender polymer is known as a polyurethane latex, although it is well recognized that the reaction of the prepolymer with water results in the introduction of a urea linkage and such polymer is in fact a polyurethane-urea. An alternate procedure involves the chain extension of the emulsified prepolymer in an aqueous solution of a diamine. The preparation of these emulsions is a well accepted, art recognized procedure, and the various methods employed for preparing same differ essentially in the means used to emulsify Some of the initial polyurethane latices were prepared by emulsifying an isocyanate terminated prepolymer in water in the presence of an emulsifying agent. See U.S. Pat. No. 2,968,575, Mallonee. In U.S. Pat. No. 3,178,310, Berger, a similar procedure was employed for making latices for coating paper. An improvement of this process resided in building into the prepolymer a tertiary amino nitrogen atom and emulsifying the resulting modified prepolymer with an aqueous solution of an organic carboxylic acid. See U.S. Pat. No. 3,264,134, Vill. An additional variation of the process is disclosed in British Pat. No. 1,078,202 wherein an emulsion is prepared by salt formation, which comprises building into the prepolymer a salt forming group and emulsifying the resulting modified prepolymer in an aqueous solution of a salt-forming agent. This latter process is a versatile one and has been used extensively in the preparation of polyurethane latices. Both the latices disclosed in these patents and the methods employed in preparing them find particular application in the present invention and the disclosures of said patents are herein incorporated by reference.

While the polyurethane latices provide tough abrasion resistant films and coatings which are chemically resistant, as well as possessing those high strength characteristics of polyurethanes, many efforts have been made to improve the strength of such films and coatings.

The present invention represents the culmination of a long series of investigations, conducted largely by the inventors, directed to improving the strength of the polyurethane latex films and coatings.

It is a primary object of the invention to provide an improved polyurethane latex composition.

It is another object of the invention to provide polyurethane films and coatings having improved strength.

Generally then, it is an object of this invention to provide an improved polyurethane latex composition which provides films and coatings of improved strength.

It is another object of the invention to provide vinyl modified polyurethane films which have less surface tackiness than unmodified polyurethane films.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to a composition of matter comprising a polyurethane latex and a polymer of at least one vinyl monomer, said polymer having been obtained by free radical polymerization of said monomer in the presence of the latex.

In addition, the invention also relates to the films and coatings obtained from the polyurethane latex composition.

It is to be understood that both the foregoing general description and the following detailed description are exemplary and explanatory and are not restrictive of the invention.

Broadly stated, the polyurethane latex composition of this invention is prepared by converting an isocyanate terminated prepolymer into a latex by chain extension in an aqueous medium by any of the conventional art accepted procedures as disclosed in the aforesaid patents. The latex is then modified by free radical polymerization of a compatible vinyl monomer in its presence to produce a latex which affords films and coatings having unusually good mechanical properties.

The isocyanate terminated prepolymers are prepared by reacting hydroxyl terminated polyols, preferably polymeric diols such as polyesters, polyethers and polyformals, with an organic diisocyanate. In certain instances, to effect latex modifications, it may be desirable to include with the polymeric diols a polyol of a functionality greater than two, such as polymeric triols or tetrols in minor amounts. The reaction time and temperature, and the exact proportion of reactants will vary with the reactants used and the desired properties of the end products. In general, to insure isocyanate termination in the prepolymer, the isocyanate compound and the hydroxyl compound are employed in such quantities as to provide a stoichiometric excess of isocyanate of at least 10 percent, a preferred range being from about 1.4 to 2.5 isocyanate groups for each active hydrogen present.

With regard to the organic diisocyanates, any of a wide variety of organic diisocyanates may be employed in the reaction, including aromatic, aliphatic and cycloaliphatic diisocyanates and combinations of these types. Representative compounds include 2,4-tolylene diisocyanate, 2,6-tolylene diisocyanate, and isomeric mixtures thereof, p-phenylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 2,2'-methylenebis (4-phenylisocyanate), 4,4'-methylenebis(cyclohexylisocyanate) and 1,5-tetrahydronaphthylene diisocyanate. Arylene diisocyanates, i.e., those in which each of the two isocyanate groups is attached directly to an automatic ring are preferred. In general, they react more rapidly with the polyalkylene ether glycols than do the alkylene diisocyanates. The compound 2,4-tolylene diisocyanate is preferred. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanate-4-methyl-phenyl) urea, which are the subject of U.S. Pat. No. 2,757,185, Bartell, may also be used.

The technology for preparing polyurethane prepolymers is well known, and essentially include the products and processes described in detail in British Pat. No. 1,078,202. Thus, for illustrative purposes, the following experimental data are obtained using a polyether, e.g., polypropylene glycol, a dihydroxy organic acid salt forming moiety and an organic diisocyanate to provide an isocyanate-terminated polyurethane prepolymer containing a salt forming group which is then emulsified in the presence of an organic amine to provide a latex.

Any or all of the various compounds providing salt forming groups in the polymer, as described in the British patent, are useful in the present invention, and in addition to those disclosed therein may be included 2,2'-bis(hydroxymethyl) propionic acid, a compound preferred in the present invention. In effect then, any polyurethane latex obtained by any of the means known in the art may be used to provide the improved latices of the present invention.

The term "compatible vinyl monomer", as used herein, is intended to mean any compound containing the

linkage, which can be polymerized or copolymerized with another such compound in the presence of the latex using free radical catalysis, to provide a polymer which does not undergo the transition from a hard resinous material to a rubbery material below about 60° C., and which preserves the integrity of the latex. Generally, such polymers will have a glass transition temperature (Tg) of greater than about 60° C.; that is, they are hard, resinous plastics at normal room temperatures.

When grafted onto the polyurethane latices and the latices converted into films, the polymers greatly increase the tensile properties of the films by reinforcement.

U.S. Pat. No. 3,705,164 discloses the grafting of vinyl polymers onto polyurethane latices in a manner similar to the present invention. The films and coatings produced thereby have a markedly reduced tendency to swell in water, as opposed to films produced from ungrafted polyurethanes. For example, polybutylacrylate, polyvinylacetate, polymers of a major proportions of butylacrylate with minor amounts of acrylonitrile, chloromethylmethacrylate, methacrylic acid, styrene, butadiene, and the like, when grafted onto the polyurethane latex are shown to provide water repellant films.

We have found that when polymers of certain vinyl monomers are grafted onto the polyurethane latex, the resulting films exhibit unusually high tensile properties. As defined hereinabove, the polymers which exhibit the property of reinforcement in the films are prepared from vinyl monomers whose polymers retain their hard, resinous characteristics at temperatures up to at least about 60° C. Such monomers include:

vinylidene chloride
2-chloroethylmethacrylate
cyclohexylmethacrylate
3,3-dimethyl-2-butylmethacrylate
isopropylmethacrylate
methylmethacrylate
phenylmethacrylate
cyclohexyl chloroacrylate
isobutyl chloroacrylate
methyl chloroacrylate
4-tert.butylstyrene
4-chloro-2-methylstyrene
2-chlorostyrene
3-chlorostyrene
4-chlorostyrene
2,4-dichlorostyrene
2,5-dichlorostyrene
2,6-dichlorostyrene
2,4-dimethylstyrene
2,5-dimethylstyrene
3,4-dimethylstyrene
4-methoxystyrene
4-methylstyrene
styrene
acrylonitrile
methacrylonitrile
vinyl chloride, and the like.

The glass transition temperatures of polymers from the above monomers are as follows:

| Polymer | Tg, °C. |
| --- | --- |
| Polyvinylidene chloride | ~180 |
| Poly (2-chloroethyl methacrylate) | 103 |
| Poly(cyclohexyl methacrylate) | 66 |
| Poly(3,3-dimethyl-2-butylmethacrylate) | 108 |
| Poly(isopropyl methacrylate) | 81 |
| Poly(methyl methacrylate) | 105 |
| Poly(phenyl methacrylate) | 105 |
| Poly(cyclohexyl chloroacrylate) | 99 |
| Poly(isobutyl chloroacrylate) | 90 |
| Poly(methyl chloroacrylate) | 125 |
| Poly(4-tert. butylstyrene) | 130 |
| Poly(4-chloro-2-methylstyrene) | 141 |
| Poly(2-chlorostyrene) | 119 |
| Poly(3-chlorostyrene) | 90 |
| Poly(4-chlorostyrene) | 90 |

-continued

| Polymer | Tg, °C. |
|---|---|
| Poly(2,4-dichlorostyrene) | 133 |
| Poly(2,5-dichlorostyrene) | 106 |
| Poly(2,6-dichlorostyrene) | 167 |
| Poly(2,4-dimethylstyrene) | 112 |
| Poly(2,5-dimethylstyrene) | 143 |
| Poly(3,4-dimethylstyrene) | 109 |
| Poly(4-methoxystyrene) | 89 |
| Poly(4-methylstyrene) | 93 |
| Polystyrene | 100 |
| Polyacrylonitrile | 105 |
| Poly(methacrylonitrile) | 120 |
| Polyvinyl chloride | 81 |

The vinyl monomer is polymerized in the presence of the latex by standard emulsion polymerization techniques well known in the art, using free radical initiation by dicumyl-peroxide, benzoyl peroxide, azobisisobutyronitrile, and the like. Selection of the suitable initiator may depend on the particular monomer used, on other factors inherent in the polyurethane prepolymer, such as the presence of certain functional groups, e.g. amines, which may preclude certain initiators, but generally selection of initiator is well within the ordinary skill of the art to which this invention applies. As is shown in the art, free radical initiations may also be achieved by other means, such as high energy radiation. However, the use of a free radical initiator added to the system is convenient and economical, and is therefore preferred.

The amount of vinyl monomer used is not critical and will depend on the particular characteristics desired in the latex. Generally good results may be achieved by the use of 25-75 percent by weight of the latex solids content although lower or higher amounts may be suitable. Similarly, mixtures of vinyl monomers may be used to the same extent as a single monomer. When so used the ratio of the monomers in the mixture will be such as to provide a polymer within the definition provided hereinabove.

In preparing the polyurethane latex, best results, in terms of physical properties of the ultimate films, are obtained if the chain extension reaction is carried out at temperatures around normal room temperature, i.e. about 25°-40° C., preferably at or near 25°-30° C. At elevated temperatures, i.e., at temperatures of 60°-80° C., the physical properties of the films produced therefrom may be minimally reduced. Thus, formation and chain extension of the latex may be conducted simultaneously with free radical polymerization of the vinyl monomer by conducting the reaction at a temperature sufficiently high to promote free radical polymerization. The net improvement in physical properties of the films may be minimally effected thereby; however, the physical properties of the resulting film so prepared exhibit the improved properties of the invention.

When the free radical reaction is completed, any unreacted monomer may be removed by raising the temperature and distilling the excess monomer. The finished latex is then cooled to room temperature.

While the latex will usually be used as such, it is understood that the polymer may be recovered therefrom by coagulating the latex by ordinary means and dissolved in organic solvents and sprayed onto surfaces, or compounded on a rubber mill and cured with peroxides or organic diisocyanates, and the like.

Similarly, the latex may be prepared with other additives incorporated therein, such as pigments, antioxidants, light absorbers, and the like, by incorporating such ingredients directly into the polyurethane prepolymer. Other modifications of the latex or the use of the latex will be apparent to those skilled in the art.

The following examples are provided for illustrative purposes and may include particular features of the invention. However, the examples should not be construed as limiting the invention, many variations of which are possible without departing from the spirit or scope thereof.

EXAMPLE I

Preparation of Polyurethane Prepolymers

The following were reacted as described below:

|  | Grams | Moles |
|---|---|---|
| Polypropylene glycol, mol. wt. 2000 (Union Carbide Co., Niax Polyol 2025) | 3000 | 1.5 |
| 2,2'-bis(hydroxymethyl)propionic acid (HMPA) | 150 | 1.12 |
| 2,4'Tolylene diisocyanate | 799 | 4.59 |

Polypropylene glycol was heated for 2 hours at 90° C./0.75 mm Hg to remove moisture, then cooled under nitrogen to about 60° C. The 2,2'-bis(hydroxymethyl)propionic acid was added (3.8 percent by weight of total reactants), followed by the 2,4-tolylene diisocyanates. The exothermic reaction was controlled to 70° C. and maintained for about 16 hours. The resulting polyurethane prepolymer contained 4 percent isocyanate (theory 4.19 percent).

EXAMPLE II

Preparation of Polyurethane Latex

The following were reacted as described:

| Preparation of Example I | 750 grams |
|---|---|
| Water | 2250 grams |
| Triethylamine | 30 ml. |
| [equivalent amount of triethylamine based on 2,2'-bis(hydroxymethyl)propionic acid in prepolymer] | |

Water at 5° C. was charged to a Waring Blender and triethylamine added. Vigorous agitation was started and the prepolymer added. The resulting emulsion was transferred after several minutes agitation to a stirred flask and the reaction allowed to continue at room temperature for 16 hours. The latex was then filtered through a 200 mesh screen and stored.

Unsupported, non-reinforced films were made by casting this latex onto glass plates and allowing to dry overnight, followed by drying for 3 hours at 70° C. Stress-strain properties were measured on the films. Data are shown in Table 1.

EXAMPLE III

The following illustrates the preparation of a latex in which styrene has been polymerized.

| Latex from Example II (25% solids) | 170 grams |
|---|---|
| Styrene (65% by wt. based on Latex solids content) | 27.6 grams |
| Azobisisobutyronitrile (AIBN) | 0.7 gram |

The latex was charged to a suitable reaction vessel and stirred as styrene containing AIBN was added. The temperature was slowly increased to 70° C., maintained at 70° C. for 2 hours; then raised to reflux (97° C.) and cooled to room temperature. The latex was filtered through a 200 mesh screen and films cast onto glass plates as described in Example II. Stress-strain properties are shown in Table 1.

EXAMPLE IV

Following the procedure of Example III a latex was prepared containing 50 percent by weight, based on the latex solids, of a mixture of 60 weight percent styrene and 40 weight percent acrylonitrile. Films were cast as described, stress-strain measurements made and reported in Table 1.

EXAMPLE V

Following the procedure of Example III, a latex was prepared containing 65 percent by weight, based on the latex solids, of a mixture of 60 weight percent methyl methacrylate and 40 weight percent acrylonitrile. Films were cast as described. Stress-strain data are reported in Table 1.

TABLE 1

| Film of Example | II | III | IV | V |
| --- | --- | --- | --- | --- |
| Tensile, psi | 1200 | 3000 | 3650 | 3300 |
| Elongation, % | 1000+ | 750 | 675 | 600 |
| Modulus, psi | | | | |
| at 50% | 150 | -- | 450 | 450 |
| 100% | 190 | 575 | 600 | 550 |
| 300% | 325 | 700 | 1100 | 1050 |
| 500% | 450 | 1200 | 2100 | 2350 |
| Hardness, Shore A | 52 | 66 | 75 | 75 |

EXAMPLE VI

In a series of experiments conducted in a manner similar to Example III, methylmethacrylate was polymerized in the presence of a latex in amounts varying from 20 weight percent to 65 weight percent, based on latex solids. Films were prepared from the modified latices and stress-strain properties measured thereon. Data are shown in Table 2.

TABLE 2

| | Percent by weight of methyl methacrylate | | | | |
| --- | --- | --- | --- | --- | --- |
| | 0 | 20 | 35 | 50 | 65 |
| Tensile strength, psi | 1450 | 2900 | 3325 | 3550 | 4100 |
| Elongation, % | 1000 | 750 | 700 | 580 | 480 |
| Modulus, psi | | | | | |
| at 50% | 50 | 250 | 375 | 600 | 750 |
| 100% | 100 | 340 | 500 | 800 | 900 |
| 300% | 300 | 650 | 925 | 1500 | 1900 |
| Hardness, Shore A | 52 | 68 | 76 | 80 | 85 |

The above data illustrate the considerable reinforcing effect of the vinyl polymer on the stress-strain properties of the films.

EXAMPLE VII

The following illustrates the preparation of a polyurethane latex simultaneously with vinyl polymerization leading to a latex containing 33 percent by weight styrene, based on the latex solids.

| Prepolymer of Example I | 100 grams |
| --- | --- |
| Water | 300 grams |
| Triethylamine | 4 ml. |
| Styrene | 33 grams |
| AIBN | 1.33 grams |

Water at 5° C. was charged to a Waring Blender and triethylamine added. Vigorous agitation was started and the prepolymer added. The resulting emulsion was transferred to a stirred vessel, styrene containing the catalyst was added, and the temperature raised to 70° C., maintained at 70° C. for 2 hours and then raised to reflux. The latex was cooled to room temperature, filtered through a 200 mesh screen and films cast as described in the foregoing examples.

We claim:

1. A composition of matter comprising a polyurethane latex and a polymer of at least one vinyl monomer, said composition prepared by free radical polymerization of said monomer in the presence of said latex, said monomer being characterized as capable of providing polymers having a glass transition temperature greater than about 60° C.

2. A composition according to claim 1 wherein the polyurethane latex is prepared from an isocyanate terminated prepolymer.

3. A composition according to claim 2 wherein the isocyanate terminated prepolymer has been prepared by reacting a polymeric diol with an organic diisocyanate.

4. A composition according to claim 3 wherein the polymeric diol is a polyester.

5. A composition according to claim 3 wherein the polymeric diol is a polyether.

6. A composition according to claim 5 wherein the polyether is polypropylene ether glycol.

7. A composition according to claim 3 wherein the polymeric diol is a polyformal.

8. A composition according to claim 1 wherein the polyurethane latex is prepared from an isocyanate terminated prepolymer prepared by reacting a polymeric diol, together with a minor amount of a polymeric triol with an organic diisocyanate.

9. A composition according to claim 8 wherein the isocyanate terminated prepolymer is prepared by reacting a polymeric diol, together with a minor amount of a polymeric tetrol with an organic diisocyanate.

10. A composition according to claim 1 wherein the vinyl monomer is styrene.

11. A composition according to claim 1 wherein the vinly monomer is methyl methacrylate.

12. A composition according to claim 1 wherein the vinyl monomer consists of two or more vinyl monomers.

13. A composition according to claim 1 wherein the vinyl monomer consists of a mixture of styrene and acrylonitrile.

14. A composition according to claim 1 wherein the vinyl monomer consists of a mixture of methyl methacrylate and acrylonitrile.

* * * * *